United States Patent [19]

Sonneville

[11] 3,994,436
[45] Nov. 30, 1976

[54] COMPOSITE RAILWAY TIE

[76] Inventor: Roger Paul Sonneville, 5, Rue Maurice Ravel, 92210 Saint-Cloud, France

[22] Filed: June 4, 1975

[21] Appl. No.: 584,027

[30] Foreign Application Priority Data

June 13, 1974 France ................. 74.20466
July 25, 1974 France ................. 74.25847
Dec. 19, 1974 France ................. 74.41977

[52] U.S. Cl. ............................ 238/89; 238/85; 238/90; 238/91; 238/117; 238/310
[51] Int. Cl.² ....................... E01B 3/32; E01B 3/40
[58] Field of Search ............ 238/83, 84, 85, 86, 238/88, 89, 90, 91, 92, 94, 44, 50, 54, 65, 115, 117, 29, 30, 58, 310, 315, 349; 52/660, 662, 732, 734

[56] References Cited
UNITED STATES PATENTS

| | | | |
|---|---|---|---|
| 722,501 | 3/1903 | Dunnell | 238/84 |
| 1,065,313 | 6/1913 | Lucabaugh | 238/91 |
| 1,065,686 | 6/1913 | Hyle | 238/89 |
| 1,130,455 | 3/1915 | Willard | 238/117 |
| 1,689,754 | 10/1928 | Serra | 238/94 |
| 2,754,674 | 7/1956 | Malsbury et al. | 52/734 X |
| 3,302,360 | 2/1967 | Bjerking | 52/660 X |

FOREIGN PATENTS OR APPLICATIONS

| | | | |
|---|---|---|---|
| 1,534,871 | 8/1968 | France | 52/732 |
| 1,047,105 | 12/1953 | France | 238/85 |
| 71,432 | 1/1916 | Switzerland | 238/91 |
| 71,670 | 2/1916 | Switzerland | 238/92 |
| 836,882 | 6/1960 | United Kingdom | 238/84 |

*Primary Examiner*—Robert J. Spar
*Assistant Examiner*—Randolph A. Reese
*Attorney, Agent, or Firm*—Wenderoth, Lind & Ponack

[57] ABSTRACT

The composite railway tie has performances which are substantially improved over those of ties of the prior art while it results in a saving in weight of metal necessary and in the cost of manufacture.

The reinforcement of this tie comprises a lower assembly and an upper assembly each formed by a folded steel wire defining parallel lengths of wire connected by curved portions. The reinforcement also comprises an S-section tie member including a web which is substantially vertical and contained in the vertical plane of symmetry of the tie and two flanges which are roughly horizontal. This tie member may be manufactured on a press or by cold folding relatively cheap flat steel products.

14 Claims, 7 Drawing Figures

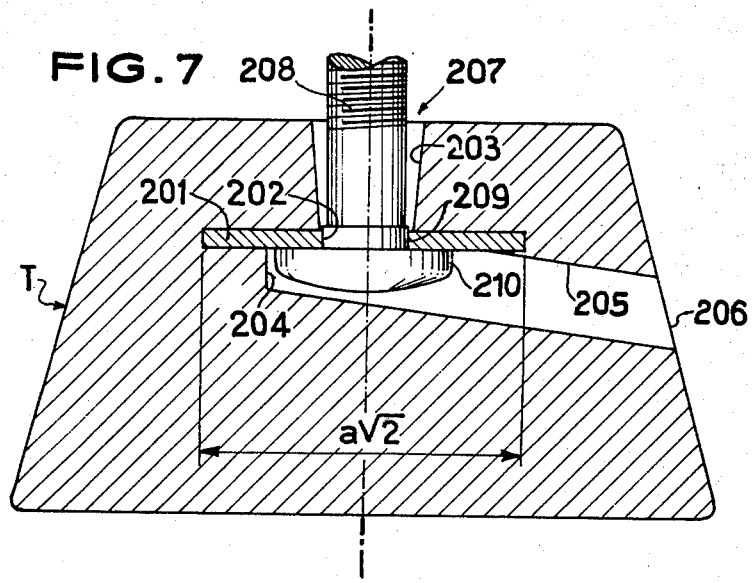
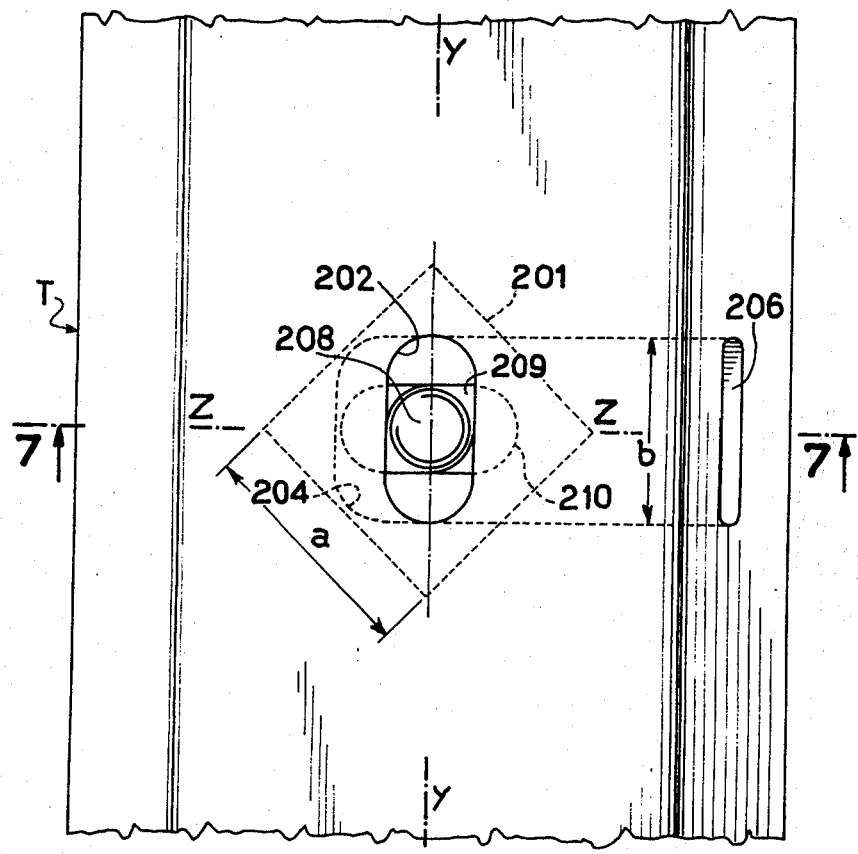

COMPOSITE RAILWAY TIE

The present invention relates to composite sleepers or ties comprising two blocks of reinforced concrete interconnected by a steel tie member or girder embedded in the concrete and constituting the main reinforcement.

These blocks are usually reinforced with an upper grid and a lower grid which are each constituted by main bars which are substantially parallel to the axis of the main deflections to which bars secondary transverse bars are welded. When the block is subjected to very high dynamic overloads and loads, for example at high speed, under the effect of surface defects of the wheels or rails, the concrete cracks as a result of bending fatique at the base of the block under the rail. It is therefore necessary to arrange that the steel members of the lower grid oppose the opening of the crack and the destruction of the block, but only the longitudinal steel members of this lower grid act in this direction.

Now, if the longitudinal bars are of mild steel, they rapidly reach and exceed their elastic limit and the cracks open under relatively low forces. The bars of hard steel have a high elastic limit but they are short and do not have a sufficient length of anchoring in the block. They slide or slip in the concrete surrounding them and do not effectively oppose the opening of the cracks. This is rendered more serious by the fact that hard steels are difficult to weld so that the tranverse bars normally adapted to reinforce the anchoring are not reliable. Concrete blocks reinforced in this conventional way rapidly become destroyed as soon as they start to crack under dynamic overloads.

An object of the present invention is to overcome these drawbacks and to provide a sleeper provided with a reinforcement which provides maximum effectiveness of the steel owing to effective anchoring in the concrete. Moreover, the girder coated by the concrete of the blocks must fully participate in their reinforcement. It must have mechanical characteristics such as : momemt of inertia with respect to a horizontal neutral axis and with respect to a vertical neutral axis and rigidity, which are particularly advantageous with respect to a given weight of steel.

This girder comprises a vertical web contained in the plane of symmetry of the sleeper. It is bound or surrounded by a continuous spiral for reinforcing its function of a reinforcement of the concrete and comprises a lower reinforcement and upper reinforcement each comprising an assembly of at least four parallel lengths of steel wire located in the same plane and interconnected in pairs by semi-circular portions placed alternately at one and the other of the ends of each length of wire so as to form a continuous zig-zag line. A number of lengths of wire may easily be adapted to the dimensions of the block. The lower reinforcement preferably comprises two identical assemblies placed one above the other in the opposite directions so that the intermediate lengths of wire are exactly superimposed whereas the rectilinear end lengths extend beyond the semi-circular portions.

According to other features of the invention:

There is employed a tie member whose section has the general shape of an S, Z, or the like, comprising a roughly vertical web disposed in the vertical plane of symmetry of the sleeper and an upper and lower flange extending in opposite directions from the two ends of the web. According to a preferred embodiment, the two flanges extend roughly at right angles to the web and are connected to the latter by a curved portion;

Means are provided in each concrete block for anchoring rail fixing means, these anchoring means being distinct from the steel tie member and disposed above the latter. It is indeed essential to avoid that these anchoring means weaken the tie member by apertures or notches as was the case in the prior art. These anchoring means comprise steel plates which are roughly square and provided with an opening whose largest dimension is oriented in the direction of a diagonal of this square and preferably parallel to the longitudinal axis of the concrete element. These anchoring plates participate in the reinforcement of the concrete in the zone where it is necessarily weakened by the openings or passageways for the passage of the rail fixing bolt.

The ensuing description of various embodiments given by way of examples, to which the invention is not intended to be limited, will show the advantages and features of the invention better. In the accompanying drawings:

FIG. 6 is a plan view of a concrete element comprising an anchoring device according to the invention, and FIG. 7 is a simplified sectional view taken on line 7—7 of FIG. 6.

Figure 1:
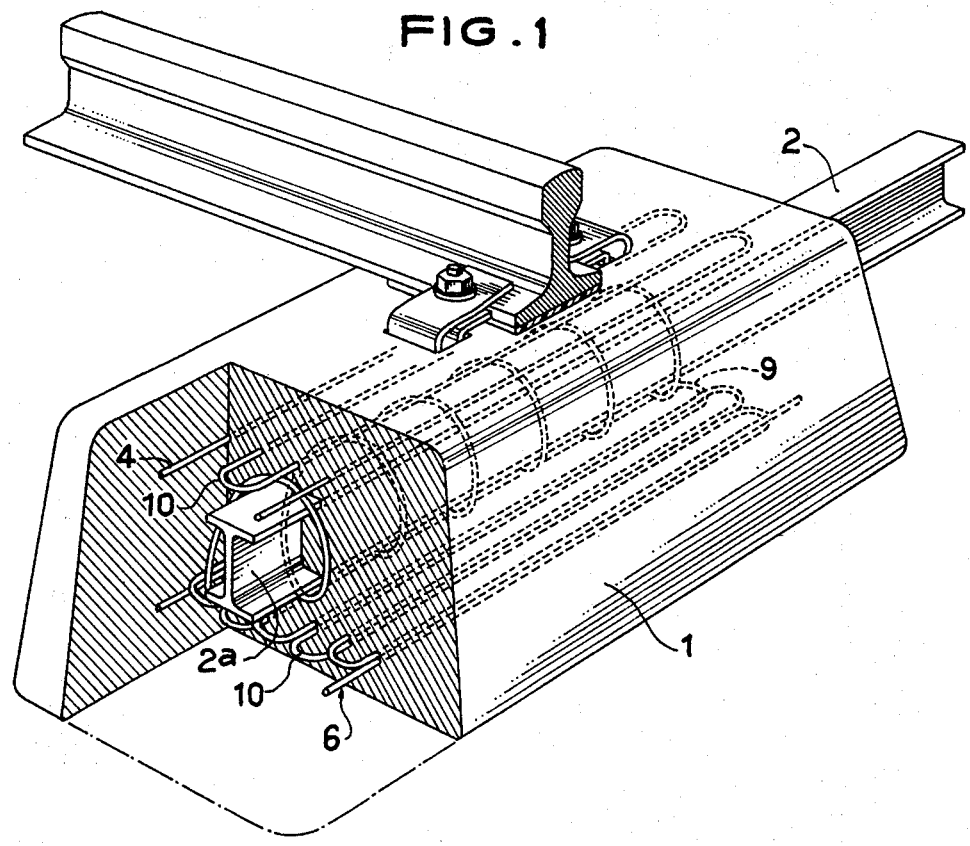
FIG. 1 is perspective view, with a part cut away, of a block of a composite sleeper or tie provided with a reinforcement according to the invention.

The sleeper or tie shown partly in FIG. 1 is a composite sleeper comprising two blocks interconnected by a metal tie member constituted by a section member, namely an I-section member in the case shown in FIG. 1, embedded at both ends in the blocks. The vertical web $2^a$ of the tie member is contained in the vertical plane of symmetry of the sleeper. As the two blocks are identical, only one thereof has been shown in the drawing.

Figure 2:
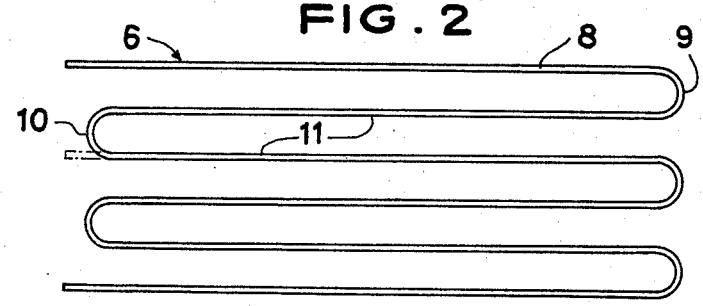
FIG. 2 is a plan view of one embodiment of this reinforcement.

The Each of these blocks is of concrete and is reinforced by two reinforcements, namely an upper reinforcement 4 and lower reinforcement 6. Each of these reinforcements is constituted by a series of parallel rectilinear lengths of reinforcement 8, 11 which are interconnected in pairs by semi-circular portions 9, 10 alternately located at each of the ends of the lengths. This reinforcement thus forms, as shown in FIG. 2, an uninterrupted zig-zag line whose intermediate lengths 11 are shorter than the end lengths 8. Each reinforcement comprises at least four lengths, two lengths 8 and two lengths 11. Of course, it may comprise more lengths, in particular, it may comprise, as the reinforcement 6 shown in FIG. 1, six lengths, that is to say two rectilinear end lengths 8 and four lengths 11, each terminating in a semicircular portion 9 or 10. Preferably, an even number of lengths is provided.

The assembly of this reinforcement is embedded in the concrete of the blocks and the rectilinear lengths disposed parallel to the axis of the main deflections oppose the opening of cracks which might appear at the base of this block.

Even if they are short, these lengths cannot slide or slip in the concrete since the semi-circular portions at the ends, which are also embedded in the concrete, prevent this sliding by the effect of their curvature. The reinforcement can thus be employed up to its elastic limit.

Figure 3:
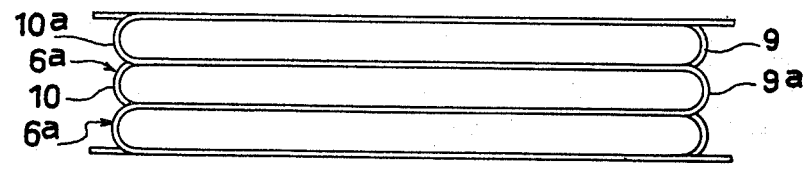
FIG. 3 is a view similar to FIG. 2 of the lower reinforcement.

In most cases, it is preferable to reinforce still further the reinforcement, at least the lower reinforcement, by employing two superimposed elements 6, 6$^a$ comprising preferably the same number of lengths, four in the case shown in FIG. 3, interconnected by semi-circular portions. These two elements 6$^a$ and 6$^b$ are disposed one above the other in opposite directions so that their intermediate lengths 11 are exactly superimposed. Consequently, at each end of these lengths 11, the semi-circular portions 9, 9$^a$ or 10, 10$^a$ of the two assemblies are substantially in alignment with each other. Clips or other tying means (not shown) may be employed for interconnecting the two assemblies.

The successive curved portions which interconnect the parallel longitudinal lengths perform the function of transverse bars for the assembly and prevent the sliding. The total effective section of steel is doubled owing to the superimposition of the two assemblies which permits the use of small section lengths or bars and in particular of a section one half of that normally employed. On the other hand, the effective area of the surface of the wire is large which ensures an improved adherence of the wire in the concrete. Moreover, as the end lengths are longer than the intermediate lengths, the reinforcement comprises eight lengths in the center part of the block, that is, in the part which is subjected to the highest stresses. On the other hand, it comprises only two lengths at each end in the but slightly stressed part of the block.

The particular shape of the lower and upper reinforcements and the fact that they may be produced without any welding from a small-section wire presents moreover the advantage of considerably facilitating their construction in that they permit a continuous manufacture by means of a simple machine. This manufacture may be easily carried out with a wire wound on a reel and presented on an unwinding machine which is fed step by step to a bending device which bends the wire alternately in one direction and then in the other.

Figure 5:
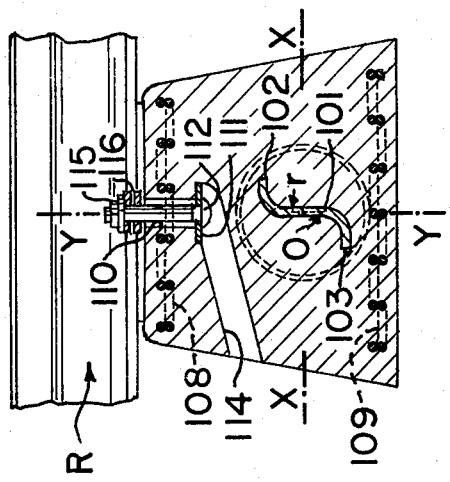
FIG. 5 is a sectional view taken on line 5—5 of FIG. 4.
Figure 4:
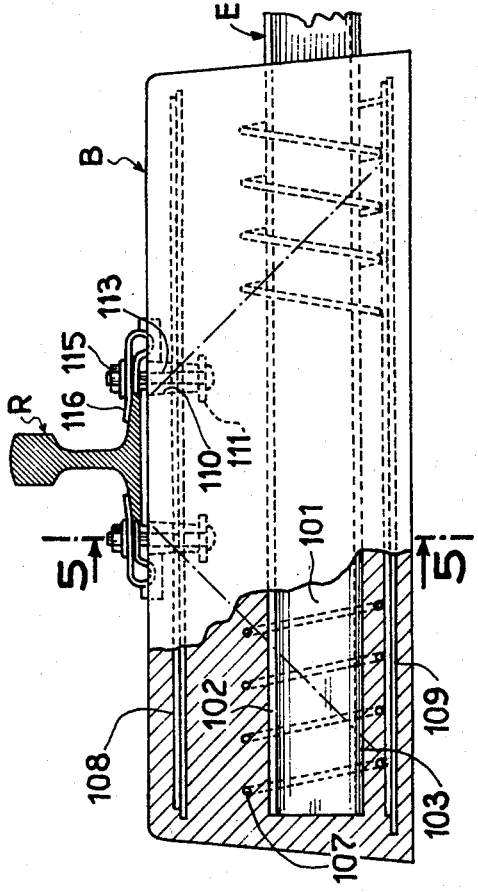
FIG. 4 is a partial longitudinal sectional view, that is to say, a view perpendicular to the direction of the track, of a modification of the composite sleeper according to the invention.

FIGS. 4 and 5 relate to a composite railway sleeper or tie only a part of which has been shown. The sleeper comprises two concrete blocks, such as B, interconnected by a tie member E. This tie member extends in each one of the blocks to a great length so as to constitute at the same time a reinforcement of this block.

The tie member E has an S-shaped cross section and comprises a web 101 which is roughly planar and disposed substantially in the vertical plane of symmetry Y-Y of the sleeper. This vertical web is extended, as viewed in FIG. 5, at the top and to the right by a roughly horizontal flange 102 whereas it is extended at the bottom and to the left by a horizontal flange 103. The two flanges are connected to the web by a curved portion having a radius $r$, $r$ being chosen in such manner that the flanges can be formed by cold folding on the tie member. For example, there may be chosen for the dimension $r$ a value equal to about twice the thickness of the strip of steel employed. The section obtained is roughly symmetrical with respect to the point O (FIG. 5). The horizontal neutral axis of the tie member E will be designated by X—X.

The concrete surrounding and coating the tie member E is bound by a reinforcement 107 in the form of a continuous helical or spiral member. It is moreover reinforced by reinforcements 108, 109 which are respectively disposed at the upper part and lower part of the block, as those defined hereinbefore with reference to FIGS. 1 to 3.

The concrete block further comprises a vertical passageway 110 which opens onto its upper face and at the lower part of which there is provided an anchoring plate 111. The latter comprises in the known manner an opening 112 of rectangular shape in which the head of a bolt 113 of the "hammer head" type can engage. Another inclined passageway 114 extends between a lateral face of the concrete block and the lower part of the vertical passageway 110 so as to allow the flow of water and the cleaning out of impurities which may enter the vertical passageway 110. This passageway 114 also permits the rotation of the head of the bolt under the plate 111. This plate 111 reinforces the concrete around the passageway 114 which would otherwise weaken the concrete.

On each concrete block there bears through suitable means (not shown) a rail R which is held in position by fastening devices by any suitable type and which comprise mainly an assembly having a bolt 113 and nut 115 and a fastener or clip 116 having a certain elasticity and laterally and vertically maintaining the rail.

There will now be pointed out the important advantages that such a sleeper or tie has over known sleepers or ties.

First it is interesting to compare the mechanical characteristics of the section members employed in the prior art and the section members according to the invention.

The standardized I-section members have a high vertical inertia to the detriment of the thickness of the web. I-section girders of, for example, 80 × 42 mm have been employed, but the excessively thin thickness of their web, namely 3.9 mm, has reduced their useful life owing to corrosion between the blocks. A special I-section member having a thick web would encounter difficulties as concerns availability of supplies and would have an excessive weight.

T or Y-section members also employed on a large scale have the drawback of being excessively dissymetrical with respect to the horizontal neutral axis. Consequently, they are too easily deformable, the neutral axis being too near to the branches of the T or Y. Any deflection exceeding even to a small extent the elastic limit of the steel results in a large permanent deformation which alters the geometry of the track.

An L-section member disposed with its bi-secting plane horizontal, such as described in French Pat. No. 1,429,382, has a high moment of inertia for its weight of steel but, as it does not have a vertical web, it is very deformable. If this section member is disposed with one flange vertical, it then has a high dissymetry which results in the same drawbacks as in the case of the T-section member with a low inertia with respect to the weight.

Another important factor which renders the section members just described of little interest resides in their manner of manufacture. Indeed, the evolution of the steel industry toward flat products results in less and less "merchant" section members such as T-,V-,I-or L-section members, so that the supply of such section members becomes costly if not hazardous, above all in the special qualities or grades of steel which have a high elastic limit or resist corrosion which offer considerable advantages in the construction of tie members for composite sleepers.

The following table shows, according to the different shapes and dimensions of the section members, the weight per meter of section member, the height, the value of the moment of inertia with respect to the horizontal neutral axis and the modulus of section:

| | Section and dimension of the section member | Weight in kg per meter | Height in mm | I x-x en cm | W x-x₃ en cm |
|---|---|---|---|---|---|
| a | Y | 7.5 | 76 | 42.5 | 9.05 |
| b | T | 4.8 | 59 | 19 | 4.75 |
| c | L 60 × 60 × 7 mm vertical flange | 6.3 | 60 | 26.25 | 5.36 |
| d | L 60 × 60 × 7 mm horiz. bisector plane | 6.3 | 85 | 42.25 | 9.16 |
| e | S 120 × 7 mm | 6.6 | 90 | 70.6 | 15.7 |
| f | S 110 × 6 mm | 5.18 | 80 | 52.1 | 13.0 |
| g | S 120 × 6.35 mm | 6.0 | 80 | 52.7 | 13.2 |
| h | S 90 × 6 mm | 4.25 | 70 | 31.4 | 5.5 |
| i | S 80 × 6 mm | 3.7 | 60 | 20.0 | 6.7 |

If the solution $e$ according to the invention is compared with the solution $a$ which is employed presently on the PARIS-LYON railway line, it is clear that for a weight 15% less, the moment of inertia is increased by 65% and the modulus of section by 70%.

If the same section member of the solution $e$ is compared with the L-section member of the solution $c$, it is clear that the moment of inertia and the modulus of section are almost tripled for a weight hardly 15% greater.

If the solution $f$ is compared with the solution $a$, it is clear that the weight is reduced by 45% whereas the moment of inertia and the modulus of section are increased respectively by 22.5% and 43% approximately.

In the narrow track range, the section member of the solution $h$ compared with the conventional section member of the solution $b$ results in a saving of weight of 13% and an increase in the vertical moment of inertia of 65% and of the modulus of section of 45% approximately.

The cheapest section member is that of the solution $i$ and has, as can be seen, performances as concerns inertia and modulus of section slightly higher than those of the conventional section member of the solution $b$, there being with respect to the latter solution a saving in weight of steel of 30%, which is considerable.

Thus, it is clear that the invention permits a considerable saving in the weight of metal in a product of large consumption while providing a substantial improvement in the technical performances of the composite sleepers, rendering them capable of supporting high-speed traffic and high loads per axle which should permit extending the field of their application.

The following advantages should be added to this important advantage:

manufacturing in a press or by cold folding of a particularly cheap flat product;

The separation of the anchoring means from the rail fixing means of the tie member proper permits avoiding a weakening of the latter inside the block and also permits coating it entirely with concrete without any gap; furthermore, the vertical passageways for introducing the bolts in the concrete are very short, which results in a minimum weakening of the corresponding section of the concrete blocks; the anchoring plates for the blocks moreover compensate for this weakening and constitute locks at the most critical points which are the interactions of the vertical and transverse passageways; likewise, the anchoring bolts are much shorter and therefore cheaper than if they had to be anchored in the tie member;

The curved flanges of the S-section member increase both the rigidity of the tie member and its connection to the concrete while attenuating the knife effect which a web alone would have, this web being moreover too flexible transversely.

FIGS. 6 and 7 show a concrete element which may be a sleeper or tie for a railway T whose vertical plane of symmetry containing the longitudinal axis of the sleeper is designated by the reference Y—Y. The reinforcing elements of the concrete block, which are such as those described hereinbefore, have not been shown.

Roughly in the upper third of its height, the sleeper comprises an anchoring device constituted mainly by a ridid plate 201 which is sufficiently strong and constructed for example from metal or a suitable synthetic material. The plate is sealed in the concrete in the course of the molding and has, as can be seen in FIG. 6, a square shape, a diagonal of this square being horizontal and contained in the plane Y—Y. Of course, the shape of the plate may deviate slightly from that of the perfect square and be slightly rectangular or have a diamond shape or have rounded corners for example. However, the square shape offers many advantages, in particular as concerns manufacture which may be carried out practically without scrap or waste. Formed in this plate is an oblong opening 202 whose major dimension is also oriented horizontally and parallel to the plane Y—Y.

The sleeper has, as can be seen in FIG. 7, a vertical passageway 203 which is disposed above the plate, this passageway having on the whole a horizontal section of the same oblong shape as the opening 202 provided in the plate and being slightly upwardly divergent.

Provided under the plate is a cavity 204 whose dimensions are such that it allows the rotation of the hammer head of a bolt, this cavity being extended by a lateral transverse passageway 205 whose height is slightly greater than the thickness of the head of the bolt. This lateral passageway is downwardly and outwardly inclined so as to facilitate the discharge of water and waste which might fall into the verical passageway and also so that the aperture 206, through which this lateral passageway opens into the lateral face of the sleeper, be situtated in the vicinity of the horizontal neutral axis of the corresponding section of the sleeper so as to reduce weakening to a minimum.

A T-shaped bolt 207 is also shown which comprises a shank 208, a cam 209 adapted to lock the bolt in the anchoring position, and an oblong hammer head 210 achieving the anchoring under the plate in the position shown in the drawing.

As mentioned hereinbefore, the dimensions of the oblong opening in the plate are chosen to be slightly greater than the dimensions of the head of the bolt so as to allow the passage of this head; the dimensions of the plate are chosen in such manner that the cutting out of the opening in this plate does not result in an excessive weakening thereof. Thus, by way of example, if the opening has dimensions 20 × 40 mm the side a of the plate may have the dimensions of about 60 mm.

There is no need to describe in detail the operation of such a device which is clear and well known. Merely the particularly advantages thereof will now be mentioned.

The fact of employing a square shaped, or roughly square shaped plate, whose oblong opening is aligned on a diagonal, affords the following advantages:

As the oblong opening is oriented on the diagonal, its presence weakens the plate much less than if it were oriented in the usual way on a median of a square or of a rectangle;

Under the pressure exerted by the head of the bolt in its anchoring position, the section of the plate which is subjected to bending stress on the axis Z—Z, which is orthogonal to the direction Y—Y, is much greater than if the major axis of the opening and the medians of the plate were coincident and oriented on this axis Z—Z; the proportion of the moments of inertia of the plate resisting bending is in the ratio of: a  2-$b$/$a$-$b$, where $b$ is equal to the length of the opening 202. For a given strength, the plate disposed in this manner is therefore distinctly lighter and economises material more than a rectangular plate disposed squarely;

The position of the plate such as shown in the drawing has the advantage of avoiding any discontinuity of material (between the concrete and steel for example) oriented in a direction perpendicular to the isostatic lines when the sleeper is subjected to alternating bending and to shear stress in the course of the passage of rolling loads. It therefore contributes to the attentuation of fatique and its effects on the concrete.

Further, as the plate is located roughly in the upper third of the height of the sleeper, the bolt and the vertical passageway may be very short, which is an advantage as concerns the strength of the truncated pyramid surmounting the plate and subjected to shear stress when the bolt exerts on this plate an upward tensile force when tightening the fasteners on the rail (not shown in the drawing). However, the distance between the plate and the upper face of the sleeper is chosen as a function of the tightening force necessary for fixing the rail and may be the smaller as more elastic rail fasteners are employed which protect the bolt against excessive dynamic forces.

The position of the lateral or transverse passageway is also advantageous since the aperture through which this passageway opens onto the lateral face of the sleeper is in the vicinity of the horizontal neutral axis of the corresponding section of the sleeper so that weakening thereof is minimized.

The height of this transverse passageway, which slightly exceeds the thickness of the head of the bolt, permits ensuring a positioning of this bolt with no special precautions.

Preferably, in the course of the molding of the sleeper or other element of concrete the plate is held stationary on a core, acting as a means forming the vertical passageway 203, by a pin which forms the oblique transverse passageway 205. It will be understood that, when molding, the sleeper is in an inverted position compared to that shown in the drawing, that is to say its base is facing upwardly. The oblique position of the aforementioned pin has the advantage of exerting a pressure by a wedging effect on the plate 1. To improve this effect, when filling and vibrating the concrete in the mould, this pin is subjected to a permanent force, for example by means of a spring or a jack acting along the longitudinal axis of the pin. This original arrangemement, apart from the aforementioned advantage it affords, permits preventing the penetration of cement grout in the opening which thus remains clean when stripping from the mold.

Having now described my invention what I claim as new and desire to secure by Letters Patent is:

1. A composite railway tie comprising in combination two reinforced concrete blocks each having an upper face and a lower face and interconnected by a girder forming a tie member and reinforcement extending into and interconnecting the blocks, the girder having a generally substantially S-shaped cross section comprising a substantially vertical web having curved end portions and contained in a longitudinal plane of symmetry of the tie and upper and lower flanges which extend in opposite directions from the two end portions of said web, a continuous binding surrounding the girder and constituting a second reinforcement of the corresponding block, a third reinforcement adjacent said lower face of the corresponding block, a fourth reinforcement adjacent said upper face of the corresponding block, the fourth reinforcement comprising an assembly of steel wire and the third reinforcement comprising two assemblies of steel wire, each assembly of steel wire comprising at least four parallel lengths of steel wire which are contained in the same plane and are substantially parallel to said girder and connected in pairs by semi-circular portions located alternately at one end and the other end of each length and interconnecting the lengths of wire in pairs so as to form a continuous zig-zag line, the two assemblies of the third reinforcement being placed one above the other and arranged the opposite way round to each other so that the intermediate lengths of wire are exactly superimposed, and means mounted in each concrete block for anchoring rail fastening means, said anchoring means being spaced away and distinct from the tie member of steel and disposed above the tie member and below the fourth reinforcement.

2. A composite tie as claimed in claim 1, comprising an even number of said parallel lengths of wire.

3. A composite tie as claimed in claim 1, wherein those of said lengths of wire which are located at ends of each assembly are longer than the lengths of wire located in a center part of the corresponding assembly.

4. A composite tie as claimed in claim 3, wherein the end lengths of wire are rectilinear and extend beyond the semi-circular portions of the corresponding assembly.

5. A composite tie as claimed in claim 1, wherein the two flanges extend at substantially right angles to the web and the end portions connect the two flanges to the web.

6. A composite tie as claimed in claim 1, wherein each concrete block comprises vertical passageways opening onto an upper face of the block and the anchoring means are located in the lower part of the passageways, oblique passageways being provided in each block and defining under the anchoring means cavities allowing rotation of the fastening means, the oblique passageways extending to a lateral face of the block.

7. A composite tie as claimed in claim 1, wherein the anchoring means comprise a plate having a substantially square shape and defining an oblong opening whose major dimension is oriented on a diagonal of the square plate, which diagonal extends in the same direction as the longitudinal axis of the tie.

8. A composite tie as claimed in claim 7, wherein the anchoring plate is disposed substantially in the upper third of the height of the corresponding concrete block.

9. A composite tie as claimed in claim 7, comprising in each block a cavity formed under a part of the plate, and a lateral passageway which extends from the cavity and opens onto a lateral face of the block substantially at the level of the neutral axis of the block.

10. A composite tie as claimed in claim 9, wherein the fastening means comprise a bolt having a head and the cavity has such dimensions that it allows the rotation of the head of the bolt.

11. A composite tie as claimed in claim 10, wherein the lateral passageway has a height slightly greater than the thickness of the head of the bolt.

12. A composite tie as claimed in claim 7, comprising in each block a vertical passageway located in the region of the opening provided in each plate.

13. A composite tie as claimed in claim 12 wherein the vertical passageway is upwardly divergent.

14. A composite tie as claimed in claim 1, wherein the fourth reinforcement further comprises two assemblies of steel wire arranged and combined substantially in the same way as the two assemblies of steel wire of the third reinforcement.

* * * * *